Oct. 7, 1941.  E. C. JONES ET AL  2,257,961
TIRE DEFLATION AND INFLATION INDICATOR
Original Filed June 5, 1940
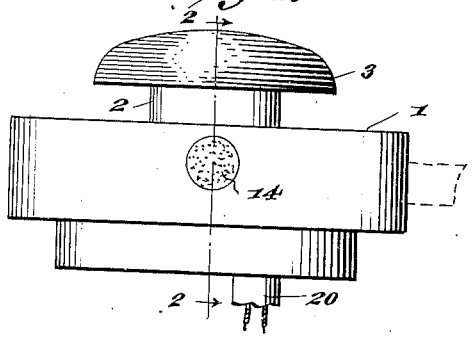
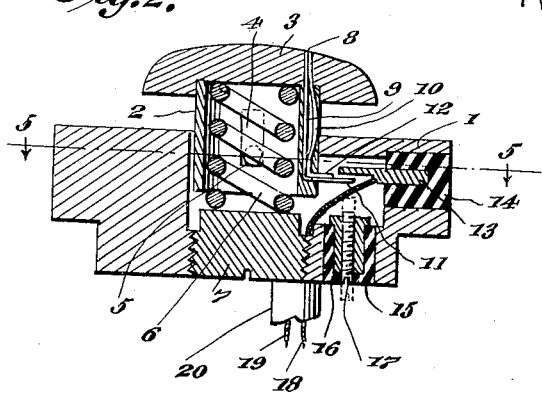
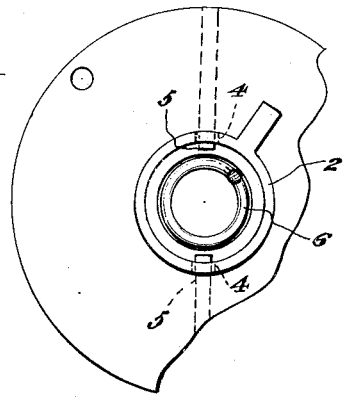
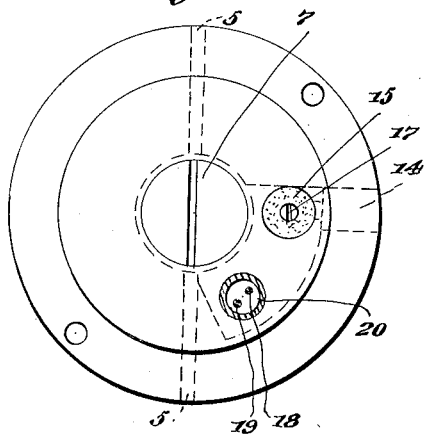
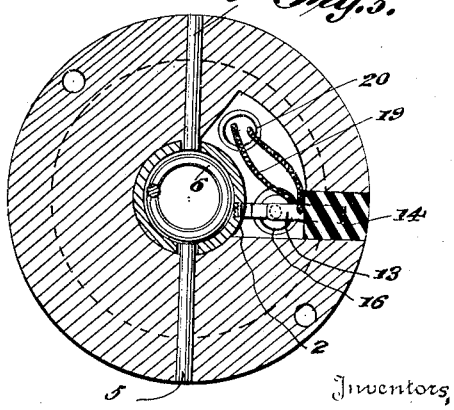
Inventors
EDWARD C. JONES and
TOM B. SEAY.
By E. E. Vrooman & Co.
Attorneys Patented Oct. 7, 1941

2,257,961

UNITED STATES PATENT OFFICE 2,257,961

TIRE DEFLATION AND INFLATION INDICATOR

Edward C. Jones and Tom B. Seay, San Antonio, Tex.

Original application June 5, 1940, Serial No. 339,018, now Patent No. 2,249,426, dated July 15, 1941. Divided and this application January 21, 1941, Serial No. 375,350

4 Claims. (Cl. 200—58)

This invention relates to a tire deflation and inflation indicator.

An object of the invention is the construction of a novel and efficient device applied to the rim of the wheel of a motor vehicle, airplane or the like, for indicating the pressure at all times within the pneumatic tire of said wheel.

Another object of the invention relates to a novel device that can be attached to, or on or through the rim and in contact with the inner tube, the device being capable of registering variation of pressure in the inner tube, by operating, through an electric circuit, indicating or signalling means on a motor vehicle, airplane or the like.

This is a divisional application growing out of our original application, Serial Number 339,018, filed June 5th, 1940, patented July 15, 1941, Pat. #2,249,426. "Tire deflation and inflation indicator."

With the foregoing and other objects in view, the invention comprises certain novel constructions, combinations, and arrangements of parts as will be hereinafter fully described, illustrated in the accompanying drawing, and more particularly pointed out in the appended claims.

In the drawing:

Figure 1 is a view in side elevation of a device constructed in accordance with the present invention.

Figure 2 is a vertical sectional view taken on line 2—2, Fig. 1, and looking in the direction of the arrows.

Figure 3 is a fragmentary plan view of the device.

Figure 4 is a bottom plan view of the device.

Figure 5 is a horizontal sectional view taken on line 5—5, Figure 2 and looking in the direction of the arrows.

Referring to the drawing, 1 designates a suitable casing into which extends a plunger unit 2, which unit is provided with a head 3. The hollow plunger unit 2, is vertically slotted at 4. In the slots 4 are the inner ends of horizontal pins 5 (Fig. 3). Within the plunger unit 2 is a coil spring 6, which exerts upward or outward pressure at all times upon the head 3. A spring-seat plug 7 is threaded into the bottom of the casing 1 and the lower end of spring 6 bears against said plug 7. By screwing inwardly or outwardly plug 7, the tension of the spring 6 can be controlled, to suit the operator.

A double L-shape spring 8 is mounted in the plunger unit 2 and head 3, this spring 8 comprises an inner section 9 and an outer section 10. The inner section 9 is provided with a horizontal extension 11, and the outer section 10 is provided with a horizontal foot 12, bearing against the extension 10, giving stability to the extension. The extension 11 is provided for engagement with the horizontal contact terminal 13; contact terminal 13 is partly embedded in the filler 14, which filler 14 is formed of any suitable non-conducting material. A second filler 15 is positioned vertically in casing 1 and supports a thimble-like terminal 16. Adjustably mounted in terminal 16 is a contact screw 17. By rotating screw 17 the inner end thereof can be moved towards or away from the extension 11 of the L-shape double spring 8.

The wire 18 is adapted to be connected to a green light of a signalling system (not shown), and the wire 19 is adapted to be connected to the danger or red light of a system as described and shown in our original application Serial Number 339,018. When the inner tube of a wheel provided with our device is suitably expanded, the portion or extension 11 will be engaging the inner end of screw 17, thereby completing the circuit to the green light of the system. However, upon the inner tube being deflated for any reason, the portion 11 engages the contact terminal 13 which results in the red light burning and the buzzer operating, to indicate to the operator that the inner tube is being deflated, or has become entirely deflated, whereupon the operator will be fully warned.

The wires 18 and 19 extend up through the bottom of casing 1 through a sleeve 20. The wire 19 is connected to the thimble-like terminal 16 as shown in Fig. 5.

It will be noted that the pins 5 prevent the hollow plunger unit 2 and its head 3 from being entirely displaced off casing 1.

The casing 1 can be applied to the rim of the wheel in any suitable manner, including the attachment of the device too.

While we have described the preferred embodiment of our invention and illustrated means in the accompanying drawing, certain changes or alterations may appear to one skilled in the art to which this invention relates during the extensive manufacture of same, and we, therefore, reserve the right to make such changes or alterations as shall fairly fall within the scope of the appended claims.

What we claim is:

1. In a device of the class described, the combination of a casing provided in its side with a terminal and in its bottom with a terminal, a plunger unit comprising a hollow member and a solid head slidably mounted on said casing, a double L-shape spring seated partly in said head and partly in said hollow member, said double L-shape spring including an extension projecting beyond said hollow member and positioned between said terminals and said spring also including a foot engaging said extension and reinforcing same.

2. In a device of the class described, the combination of a casing, a plunger unit having elongated slots in its sides, said plunger unit mounted upon said casing, pins on said casing and extending into said slots, a spring-seat plug screwed into the bottom of said casing, a spring within said plunger unit and having one end bearing against said plunger unit and the other end bearing against said plug, a contact spring in said plunger unit and having a right-angled extension, a non-conducting filler in said casing, a terminal in said filler and overhanging said right-angled extension, a second filler in said casing, a terminal in said second filler, and an adjustable screw in the last-mentioned terminal and having its inner end under said right-angled extension of said contact spring.

3. In a device of the class described, the combination of a casing adapted to be applied to a vehicle rim, said casing provided with a detachable plug in its bottom, an insulating filler in the bottom of said casing contiguous to said plug, a thimble-like terminal in said filler, a screw-element in said thimble-like terminal, a plunger unit extending down into said casing, a head on the outer end of said plunger unit, said plunger unit provided in opposite portions with vertically-elongated slots, said casing provided with horizontal pins, said pins having their inner ends extending to said slots, a coil spring within said plunger unit and having its upper end bearing against said head and lower end bearing against said plug, a double L-shape spring in said head and in one side of said plunger unit, said L-shape spring comprising an inner section and an outer section, said inner section having a right-angled extension extending through one side of said plunger unit, said outer section having a horizontal foot bearing against said extension, an insulating filler in the side of said casing, a terminal in said last-mentioned filler and having its inner end normally over said extension of said L-shape spring, and wires extending through the bottom of said casing and connected to said terminals.

4. In a device of the class described, the combination of a casing provided in its side with a terminal and in its bottom with a terminal, a plunger unit comprising a hollow member and a solid head slidably mounted on said casing, a double L-shape spring seated partly in said head and partly in said hollow member, said spring comprising an inner section and an outer section, said inner section having a right-angled extension extending through one side of said plunger unit, said outer section having a horizontal foot bearing against said extension, and said extension positioned between said terminals.

EDWARD C. JONES.
TOM B. SEAY.